United States Patent [19]

Zaslavsky et al.

[11] 4,252,017

[45] Feb. 24, 1981

[54] APPARATUS FOR MONITORING FLUID LEVEL IN A VESSEL

[76] Inventors: Leonid I. Zaslavsky, ulitsa Demyana Bednogo, 3, korpus 2, kv. 22; Jury N. Mironov, ulitsa Narodnogo Opolchenia, 21, korpus 1, kv. 127; Stanislav S. Zharkov, ulitsa Timiryazevskaya, 30, korpus 2, kv. 104; Konstantin N. Matveev, ploschad Vosstaniya, 1, kv. 451, all of Moscow, U.S.S.R.

[21] Appl. No.: 62,952

[22] Filed: Aug. 2, 1979

[51] Int. Cl.$^3$ .............................................. G01F 23/00
[52] U.S. Cl. ........................................ 73/291; 137/386
[58] Field of Search ............. 73/290 R, 291; 137/386, 137/393

[56] References Cited

U.S. PATENT DOCUMENTS

| 3,561,465 | 2/1971 | deGraaf | 137/386 X |
| 3,575,533 | 4/1971 | Bubula | 137/386 X |
| 3,590,843 | 7/1971 | Meyer | 137/393 X |
| 3,703,907 | 11/1972 | Richards | 137/386 X |
| 4,024,887 | 5/1977 | McGregor | 137/386 |
| 4,161,188 | 7/1979 | Jorgensen | 73/290 R X |

FOREIGN PATENT DOCUMENTS

806750 12/1958 United Kingdom ................. 73/290 R

Primary Examiner—Gerald Goldberg
Assistant Examiner—Joseph W. Roskos

[57] ABSTRACT

A supply pipe having its inlet end adapted for communication with a source of a liquid under pressure in excess of that of the ambient medium and its outlet end communicating via a nozzle with a shroud adapted to communicate with a vessel containing therein a fluid, at a level being monitored. The variation of the hydrodynamic condition of the flow of the liquid through the nozzle is registered dependent on the mixing of this liquid flow with the fluid being monitored. The shroud has at least one cross-section of which the ratio of the maximum size of the internal contour to the spacing of this cross-section from the outlet section of the nozzle is less than of 0.35:1. The inlet portion of the shroud is a structure wherein the internal contour of the cross-section of this portion encompasses therein the contour of the outlet section of the nozzle.

10 Claims, 12 Drawing Figures

APPARATUS FOR MONITORING FLUID LEVEL IN A VESSEL

The present invention relates to the techniques of taking measurements, and more particularly it relates to apparatus for monitoring the level of a fluid in a vessel.

Apparatus constructed in accordance with the present invention can be incorporated with utmost effectiveness in systems for the automatic control of the supply, delivery and distribution of various fluids.

Thus, apparatus in accordance with the invention can be incorporated in production plants in the petrochemical and food industries, in vehicles, e.g. in the fuel systems of vehicles and aircraft, as well as in water supply and similar systems.

There is known apparatus for monitoring the level of a fluid in a vessel. The known apparatus comprises a supply pipe adapted to have its inlet end communicating with a source of a liquid under pressure. The outlet end of this supply pipe communicates via a nozzle with a shroud adapted to communicate with the vessel containing the fluid, at the level being monitored.

Furthermore, the known apparatus comprises a device for registering the variation of the hydrodynamic condition of the flow of the liquid through the nozzle, dependent on the mixing of this liquid flow with the fluid.

The shroud is arranged coaxially with the nozzle and adjoins the latter by its inlet portion. The internal surface of the shroud is the surface of a body of revolution, flaring toward the open end of the shroud.

The known apparatus further includes a control passage or duct made in the wall of the shroud adjacent to the nozzle. The outlet opening of the control duct opens into the internal space of the shroud, while the inlet opening of the control duct is so positioned that in the operating position of the apparatus it underlies the monitored level of the fluid which latter in operation of the apparatus acts upon the jet issuing from the nozzle.

The registering device of the known apparatus includes a pressure pickup and a measuring duct adapted to shape a signal representative of the pressure of the fluid and to transmit this signal to the pressure pickup. The inlet opening of the measuring duct is arranged in opposition to the outlet portion of the shroud and is coaxial with the nozzle (see, for example, the FRG Pat. No. 2,111,973, IPC F 15 c 1/00, dated 1972).

In the absence of the fluid in the vessel at the monitored level, the jet of the liquid issues from the nozzle substantially transversely of the surface of the fluid in the vessel, in a laminar flow, the jet passing through the shroud without contacting its walls and entering the inlet of the measuring duct when it exits from the shroud.

If the fluid fills the vessel to the monitored level, the fluid enters the internal space of the shroud via the control duct and exerts action upon the liquid jet issuing from the nozzle. Consequently, the flow of the liquid acquires a turbulent character, the jet becoming deflected and engaging the wall of the shroud, facing the outlet of the control passage, whereby the liquid flows out of the shroud, bypassing the inlet of the measuring duct.

In each one of the two abovedescribed cases there is formed a corresponding pressure signal, the latter being stronger when there is no fluid at the monitored level, and weaker when the fluid fills the vessel to the monitored level.

Because of a prerequisite of operation of the hitherto known apparatus is the laminar character of the liquid jet issuing from the nozzle, the apparatus is, in a practical manner, operable only at relatively low velocities of the liquid issuing from the nozzle. Therefore, the apparatus forms pressure signals of relatively low values.

In addition, when the hitherto known apparatus is operated, it is relatively difficult to provide for maintaining or storing the shaped pressure signal representative of the presence of the fluid in the vessel at the monitored level for a prolonged period, following an instantaneous or short-time appearance of the fluid exactly at the monitored level.

Furthermore, since the operation of the hitherto known apparatus is dependent on maintaining the required direction of the liquid jet issuing from the nozzle relative to the surface of the fluid, the apparatus is susceptible to accelerated movements of the elements of the system with which the apparatus is associated, which sharply affects the reliability of the performance of the apparatus in mobile systems. This is caused by the fact that in the course of such accelerated movements the surface of the fluid is subjected to substantial oscillatory disturbances, and the actual position of this surface relative to the hitherto known apparatus in the place of its installation may essentially vary from the predetermined one.

It is an object of the present invention to provide apparatus for monitoring the level of a fluid in a vessel, wherein the shroud should be of a structure enabling the monitoring of the level of the fluid at higher values of pressure and velocity of the liquid issuing from the nozzle, and, hence, at higher values of the output pressure signal.

It is another not less important object of the present invention to provide apparatus for monitoring the level of a fluid in a vessel, wherein the shroud should be of a structure providing for the prolonged maintainance or storage of the shaped output pressure signal representative of the presence of the fluid at the monitored level, following the instantaneous or short-time appearance of the fluid at this very monitored level.

It is a further object of the present invention to create apparatus for monitoring the level of a fluid in a vessel, wherein the shroud should be of a structure providing for a reduced response of the apparatus to accelerated movements of the elements of the system with which the apparatus is associated or wherein it is incorporated.

These and other objects of the present invention are attained in apparatus for monitoring the level of a fluid in a vessel, wherein the supply pipe has its inlet end adapted for communication with a source of a liquid under a pressure in excess of that of the ambient medium, while its outlet end communicates via a nozzle with a shroud adapted to communicate with the fluid at the level being monitored, there being also included a device for registering the variation of the hydrodynamic condition of the liquid flow through this nozzle, dependent on the mixing of this flow with the fluid, in which apparatus, in accordance with the invention, the shroud has at least one cross-section of which the ratio of the maximum size of the internal contour to the spacing of this cross-section from the outlet section of the nozzle is less than 0.35:1, the inlet portion of the shroud being such that the internal contour of its cross-section encompasses therein the contour of the outlet section of the nozzle.

Due to this structural design of the apparatus, the liquid flow issuing from the nozzle, as it engages or mixes with the fluid filling the vessel to the monitored level, expands and isolates or cuts off the area adjoining the inlet portion of the shroud, so that suction is created in this area, with the liquid flow filling up the entire section area of the outlet portion of the shroud.

When the liquid issues from the nozzle without the subsequent expansion of its flow or jet, the latter occupies but a relatively small part of the section of the outlet portion of the shroud, the pressure in the inlet portion of the shroud substantially equalling the pressure downstream of the outlet portion of the said shroud. Therefore, the hydrodynamic condition or state of the liquid flow through the nozzle, in the presence of the fluid at the monitored level, can be relatively easily monitored also at high values of the pressure and velocity of the liquid issuing from the nozzle.

Thereby, the operability of the apparatus is ensured within a broad range of possible values of the pressure and velocity of the liquid issuing from the nozzle, as well as with a substantially turbulent character of the flow associated with high velocity values.

This provides for shaping an output pressure signal of values substantially higher than those attainable in the hitherto known apparatus.

Furthermore, the creation in the inlet portion of the shroud of a suction area leads to a stable and distinct variation of the hydrodynamic condition of the flow of the liquid issuing from the nozzle. Should it be necessary, this varied condition of the flow may be maintained for an indefinitely long period, even during the subsequent absence of the fluid at the monitored level.

This provides for a possibility of prolonged maintenance or storage of the shaped output pressure signal representative of the presence of the fluid at the monitored level, following the instantaneous or short-time appearance of the fluid at this monitored level.

It is expedient that the inlet portion of the shroud should be provided with a pipe adapted to have its inlet end communicating with the fluid at another monitored level.

This feature is essential when the aim is that of monitoring the variation of the level of a fluid in a vessel between two monitored values, the outlet portion of the shroud communicating with one of these two levels, and the pipe provided at the inlet portion of the shroud communicating with the other level.

The incorporation of the last-mentioned pipe enables variation of the hydrodynamic condition of the flow, in dependence of the presence of the fluid at the other monitored level.

The incorporation of this pipe further makes possible the repeated monitoring of both the presence and absence of the fluid at both monitored levels.

It may be expedient that the inlet end of the said pipe should be spaced from the longitudinal axis of the shroud.

This axially offset position of the pipe provides for monitoring the variation of the level of the fluid within the predetermined range of the levels, which, in its turn, expands the applicability of the apparatus in systems for automatic control of the supply, delivery and distribution of fluids.

It is expedient that the pipe should accommodate therein means for restricting or limiting the flow rate of the fluid.

The incorporation of the flow rate limiter in the pipe permits a substantial increase in the level of the output pressure signal. This feature further broadens the applicability of the apparatus for automatic control of the supply and delivery of fluids.

It is still further expedient that in the apparatus wherein the registering device includes a pressure pickup with a sensitive or responsive element, and a measuring duct having its outlet end communicating with this pressure pickup, in accordance with an embodiment of the invention, the inlet portion of the shroud should communicate with the inlet end of the measuring duct of the registering device.

The communication between the inlet portion of the shroud and the pressure pickup provides for registration of the variation of the hydrodynamic condition of the liquid flow, as the fluid level varies, by the variation of the pressure of the liquid in the flow.

It is also expedient that the inlet portion of the shroud should communicate with the inlet end of the measuring duct via the supply pipe and the nozzle.

The communication between the inlet portion of the shroud and the measuring duct via the nozzle provides for registration of the variation of the hydrodynamic condition of the flow of the liquid by a variation of the positive excessive pressure of the liquid upstream of the nozzle.

It is still further expedient that the apparatus should comprise a limiter of the flow rate of the liquid, arranged in the supply pipe intermediate of the liquid supply source and the inlet end of the measuring duct of the registering device.

The incorporation of the last-mentioned flow rate limiter provides for a sharper variation of the excessive or gauge pressure in the measuring duct of the registering device, caused by the variation of the hydrodynamic condition of the liquid flow, and, hence, for an enhanced monitoring accuracy.

It is still further expedient that in the apparatus wherein the registering device includes a pressure pickup with a responsive element, and a measuring duct of which the outlet end communicates with the pressure pickup, while its inlet end faces the outlet portion of the shroud and is arranged coaxially with the nozzle, in accordance with an embodiment of the invention, the inner side of the outlet portion of the shroud should be provided with ribs extending helically and adapted to impart a tangential component of the velocity to the flow issuing from the nozzle.

The provision of the helical ribs ensures an increase of the total pressure at the periphery of the flow and the reduction of the total pressure adjacent to the axis of the shroud. This feature further enhances the reliability of the level-monitoring operation, owing to the still further reduction of the value of the pressure signal as the fluid appears at any monitored level.

It is still further expedient that in the apparatus wherein the registering device includes a pressure pickup with a responsive element, and a measuring duct of which the outlet end communicates with the pressure pickup, the inlet end of the measuring duct facing the outlet portion of the shroud and arranged coaxially with the nozzle, in accordance with an embodiment of the invention, the outlet portion of the shroud should extend at an angle to the longitudinal axis of the nozzle.

This relative arrangement of the shroud and nozzle provides for guiding the flow downstream of the outlet portion of the shroud sidewise relative to the inlet end of the measuring duct, as the fluid appears at any one of the levels being monitored.

This feature provides for still further reduction of the value of the pressure signal in the last-described case, and thereby further enhances the reliability of the operation of the apparatus.

Finally, it is expedient that in the apparatus wherein the registering device includes a pressure pickup with a responsive element, and a measuring duct of which the outlet end communicates with the pressure pickup and the inlet end faces the outlet portion of the shroud and is spaced from the axis of the nozzle, in accordance with an embodiment of the invention, the outlet portion of the shroud should extend coaxially with the nozzle.

This relative arrangement of the outlet portion of the shroud and of the nozzle enables an additional signal to be obtained representative of the presence of the fluid at the monitored level downstream of the outlet portion of the shroud in the form of positive gauge or excessive pressure.

An apparatus constructed in accordance with the present invention provides for reliable monitoring of the level of a fluid within a broad range of the values of the pressure and velocity of the flow issuing from the nozzle, ensuring as it does a high level of the output signal throughout this broad range of the pressure and velocity values.

Furthermore, an apparatus constructed in accordance with the present invention provides for storing the signal representative of the presence of the fluid at the monitored level downstream of the shroud for any required time, including the time in which variation of the level of the fluid within a predetermined range of values occurs.

An apparatus constructed in accordance with the present invention provides for obtaining simultaneously several signals representative both of the presence and absence of the fluid downstream of the shroud and upstream of the pipe communicating with another level.

It is possible to derive at the same time electric signals, positive gauge pressure signals and suction signals by measuring the static and total pressure of the liquid flow.

The herein disclosed apparatus is relatively simple and inexpensive in manufacture.

Given hereinbelow is a description of several embodiments of the invention, with reference being made to the accompanying drawings wherein.

Figures 1, 3, 4:
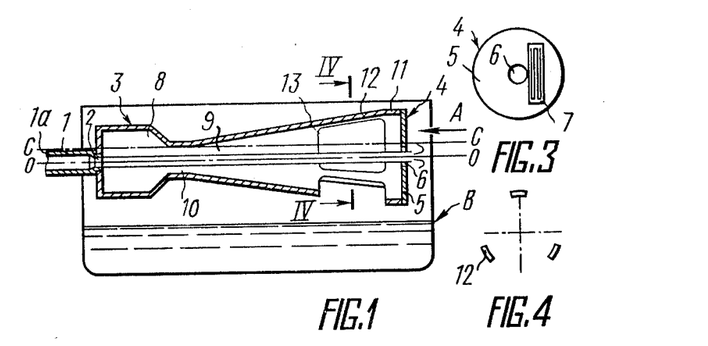
FIG. 1 is a schematic longitudinal sectional view of an apparatus for monitoring the level of a fluid in a vessel, embodying the invention, in the absence of the fluid at the monitored level.
FIG. 3 is an end view taken in the direction of arrow line A in FIG. 1.
FIG. 4 is a schematic sectional view of the apparatus, taken on line IV—IV of FIG. 1.

Referring now in particular to the appended drawings, the herein disclosed apparatus is intended for monitoring the level of a fluid in a vessel B (FIG. 1). The apparatus includes a supply pipe 1 (FIGS. 1 and 2) adapted to have its inlet end 1a communicating with a source (not shown) of a liquid at a pressure above that of the ambient medium. The pipe 1 has its outlet end adjoining a jet nozzle 2 coaxial therewith. The apparatus further comprises a shroud 3 arranged coaxially with the nozzle 2 and the supply pipe 1. Thus, the latter communicates via the nozzle 2 with the shroud 3, which is adapted to communicate with a vessel B which contain a fluid and which is to be filled to a level C—C. The axis of the nozzle 2 coincides with the longitudinal axis of the shroud 3 and is designated as O—O.

Figure 2:
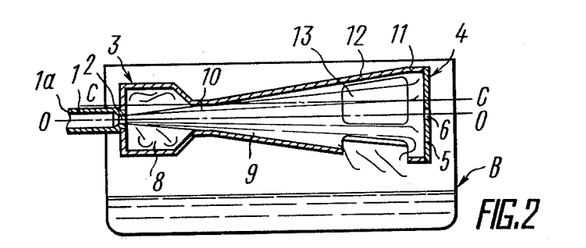
FIG. 2 is a view similar to FIG. 1, following the instantaneous appearance of the fluid at the monitored level.

The apparatus further comprises a device 4 for registering a variation in the hydrodynamic condition or state of the flow of the liquid through the nozzle 2, caused by the flow mixing with or engaging the fluid in the vessel B.

The device 4 includes a flexible diaphragm 5 arranged perpendicularly to the longitudinal axis O—O of the apparatus, in opposition to the shroud 3 and coaxially therewith.

The diaphragm 5 is intended to interact with the flow of the liquid through the nozzle 2 upon the hydrodynamic condition of this flow being changed as a result of the flow engaging or mixing with the fluid in the vessel B.

The diaphragm 5 has an opening 6 aligned with the longitudinal axis O—O, through which the liquid flow issuing from the nozzle 2 is adapted to pass.

Mounted exteriorly on the diaphragm 5 is an electric strain gauge 7 (FIG. 3) connected to a power source (not shown) and adapted to respond to deformation of the diaphragm 5 by emitting a signal derived from the varied resistance of the strain gauge 7, the latter having any suitable known per se structure. The strain gauge 7 is also connected to an instrument (not shown) adapted to receive and register its signal, the instrument likewise being of any known per se structure, suitable for the purpose.

The shroud 3 has an inlet portion 8 (FIGS. 1 and 2). The inlet portion 8 is of a cylindrical shape and is intended to maintain the stability of the variation of the hydrodynamic condition of the flow due to the presence of the fluid in the vessel B at the level C—C being monitored, as shown in FIG. 2.

The shroud 3 further has an outlet portion 9 shaped as frustum of cone and adapted to ensure the stability of the variation of the hydrodynamic condition of the flow due to a wide range of variation of pressures and velocities of the liquid issuing from the nozzle 2. The nozzle 3 further has a neck portion 10 shaped as a cylindrical pipe and serving as a connection or transition between the portion 8 and the portion 9. In cross-section, the neck portion 10 has a closed circular contour.

In accordance with the invention, the ratio of the maximum size of the internal contour of the neck portion 10 to the spacing of this section from the outlet section of the nozzle 2 is less than 0.35:1.

This ratio of the two abovementioned dimensions is essential for ensuring the engagement of the liquid flow issuing from the nozzle 2 with the neck portion 10 along the entire contour of its cross-section, following the engagement or mixing of this flow with the fluid filling the vessel B.

In accordance with the invention, the inlet portion 8 of the nozzle 3 is of a structure wherein the internal contour of its cross-section encompasses therein the contour of the outlet section of the nozzle 2, to define the internal space of the inlet portion 8 and to separate this space from the interior of the vessel B.

The apparatus further comprises a ring 11 adapted to have the registering device 4 mounted thereon. The ring 11 is arranged coaxially with the shroud 3 and is connected thereto via three connecting strips 12 (FIG. 4). The connecting strips 12 are uniformly angularly spaced about the perimeter of the outlet portion 9 of the shroud 3 and of the ring 11. In the embodiment being described the connecting strips 12 are made integral with the ring 11.

The connecting strips 12 define ports 13 establishing communication between the interior of the shroud 3 and the vessel B.

The axis O—O of the apparatus of the presently described embodiment extends horizontally. However, the angle defined by the axis O—O of the apparatus and the surface of the fluid may be arbitrarily varied within a substantial range, should it be necessary for the optimum arrangement of the apparatus in the vessel. The only imperative condition is that in any case of the arrangement of the apparatus, it should be ensured that the fluid should get into the shroud from the level being monitored, wherever this level is located in the vessel.

Due to the shroud 3 being of a cross-sectional shape of which the ratio of the greatest size of the contour to the spacing thereof from the outlet section of the nozzle 2 is less than 0.35:1, and also due to the fact that the inlet portion 8 encompasses by the internal contour of its cross-section the contour of the outlet section of the nozzle 2, when the flow of the liquid issuing from the nozzle 2 engages the fluid in the vessel B, there is ensured reliable isolation of the internal space of the inlet portion 8 from the vessel B. This results from the engagement of the liquid flow in this case with the neck portion 10 along the entire contour of the latter's cross-section. Consequently, there is set up in the internal space of the inlet portion 8 a pressure value which corresponds to the static pressure of the liquid flow, which is lower than the pressure in the vessel B, whereby the variation of the hydrodynamic condition of the liquid flow, that has taken place, acquires a stable character, which provides for dependable registering of this variation, and, hence, reliable monitoring of the level which has been attained by the fluid.

According to another embodiment of the apparatus for monitoring the level of a fluid, illustrated schematically in FIG. 5, the supply pipe 1 with the nozzle 2, the shroud 3 and the registering device 4, i.e. all the components designated with numerals 1, 2, 3, 4, 5, 6, 7, 8, 9, 10, 11, 12 and 13 have the same structure as those described hereinabove and illustrated in FIGS. 1, 2, 3 and 4.

Figure 5:
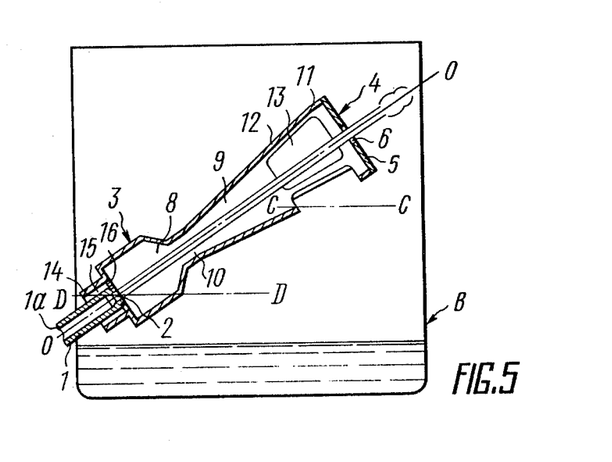
FIG. 5 is a schematic longitudinal sectional view of an apparatus embodying the present invention, including a pipe adapted for communication with the vessel containing the fluid at another monitored level, the apparatus being inclined relative to the levels of the fluid, and the fluid being absent at both monitored levels.

However, in the embodiment illustrated in FIG. 5 the inlet portion 8 of the shroud 3 is provided with a pipe 14 adapted to have its inlet end communicating with the fluid filling the vessel B to another monitored level D—D.

At the same time, the shroud 3 is adapted to have its outlet portion 9 communicating with the fluid in the vessel B at the level C—C being also monitored.

It is possible that the monitored levels C—C and D—D of the fluid with which the outlet portion 9 of the shroud 3 and the inlet end of the pipe 14 are adapted to communicate, respectively, be positioned in different vessels (not shown).

In the embodiment of the apparatus, illustrated in FIG. 5, the axis O—O of the apparatus is inclined. However, the apparatus of the present embodiment may function reliably with the axis O—O extending at any angle to a horizontal plane.

The pipe 14 extends concentrically with the supply pipe 1 and defines therewith an annular duct 15.

Made through the upstream end face wall of the inlet portion 8 of the shroud 3, as it is shown in FIG. 5, are four openings 16 adapted to establish communication between the inlet portion 8 of the shroud 3 and the annular duct 15. The openings 16 are uniformly angularly spaced about this end face wall of the portion 8. With the presently described embodiment of the apparatus being such that the liquid flow issuing from the nozzle 2 is able to engage the fluid coming from the vessel B and finding its way into the internal space of the inlet portion 8 of the shroud 3 either through the outlet portion 9 of the shroud 3 or through the pipe 14, i.e. either from the level C—C or from the level D—D, the apparatus monitors the level of the fluid at both said levels.

The sequence and the values of the respective signals of the registering device 4 depend in this case on the sequence of the appearance of the fluid at the levels C—C and D—D.

In yet another embodiment of the presently described apparatus, illustrated schematically in FIG. 6, the supply pipe 1 with the nozzle 2, the shroud 3 and the registering device 4, i.e. all the components designated with numerals 1, 2, 3, 4, 5, 6, 7, 8, 9, 10, 11, 12 and 13 are of the structure similar to that described hereinabove and illustrated in FIGS. 1, 2, 3 and 4.

Figure 6:
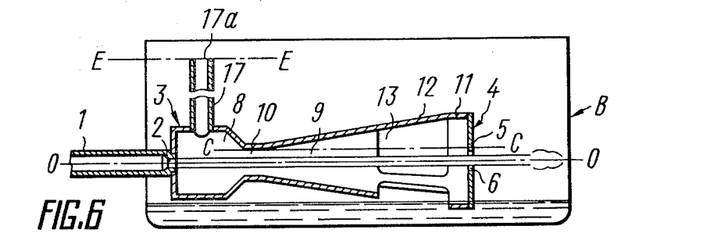
FIG. 6 is a schematic longitudinal sectional view of apparatus embodying the present invention, including an upwardly extending pipe by which the shroud communicates with the fluid at another monitored level, the inlet end of the pipe being offset relative to the longitudinal axis of the shroud, the fluid being absent at both monitored levels.

In the embodiment illustrated in FIG. 6 the inlet portion 8 of the shroud 3 is provided with a branch pipe 17 extending perpendicularly to the longitudinal axis O—O of the shroud 3 and rising upwardly therefrom.

The branch pipe 17 is adapted to have its inlet end 17a communicating with another monitored level E—E of the fluid, this inlet end 17a of the branch pipe 17 being thus spaced from the longitudinal axis O—O of the shroud 3.

The monitored level E—E of the fluid, with which the inlet end 17a of the branch pipe 17 is adapted to communicate with the apparatus being arranged as shown in FIG. 6, is situated above the other monitored level C—C with which the outlet portion 9 of the shroud 3 communicates.

Since in any position of the fluid level intermediate the two monitored levels C—C and E—E the supply of the fluid into the outlet portion 9 of the shroud 3 practically does not vary, the spacing between the monitored levels C—C and E—E of the fluid in the vessel B additionally enhances the stability of the hydrodynamic condition of the mixed flow of the liquid in the outlet portion 9 of the shroud 3 while the fluid level varies between the two monitored values C—C and E—E. The above feature of the apparatus is likewise present when the inlet end 17a of the branch pipe 17 is disposed below the outlet portion 9 of the shroud 3, as it will be described hereinbelow.

In still another embodiment of the present invention in an apparatus for monitoring the level of a fluid in a vessel B, schematically illustrated in FIG. 7, the supply pipe with the nozzle 2, the shroud 3 and the registering device 4, i.e. all the components designated with numerals 1, 2, 3, 4, 5, 6, 7, 8, 9, 10, 11, 12, 13 and 17 are of the structure similar to that described hereinabove and illustrated in FIG. 6, the difference being in that the branch pipe 17 has its inlet end 17a facing downwardly.

Figure 7:
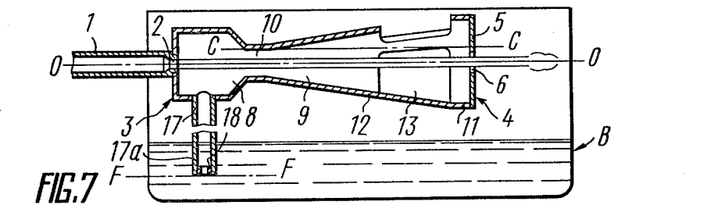
FIG. 7 is a schematic longitudinal sectional view of apparatus embodying the present invention, including a fluid flow rate limiter mounted in a downwardly extending pipe communicating the shroud with the vessel containing the fluid at another monitored level.

In the embodiment of the apparatus, illustrated in FIG. 7, the branch pipe 17 has mounted therein a limiter or restrictor 18 of the flow rate of the fluid. The limiter 18 has been incorporated in order that, with the hydrodynamic condition of the flow issuing from the nozzle 2 varying on account of this flow engaging and mixing with the fluid coming from the vessel B, the variation of the signal transmitted by the registering device 4 should be more pronounced.

The fluid flow rate limiter 18 is in the presently described embodiment in the form of a short flow-restricting tube mounted in the inlet end 17a of the branch pipe 17, the diameter of the bore of this tube being smaller than the internal diameter of the branch pipe 17.

However, the fluid flow rate limiter 18 may be of any other known structure suitable for the purpose.

In the embodiment illustrated in FIG. 7 the inlet end 17a of the branch pipe 17 is likewise spaced from the longitudinal axis O—O of the shroud 3. This is done by the shroud having been rotated so that its branch pipe 17 is facing vertically downward, its inlet end 17a having been thus positioned within the vessel B at a monitored level F—F.

The arrangement of the apparatus with the branch pipe 17a facing downwardly is expedient in applications where it is desirable to delay the variation of the hydrodynamic condition of the liquid flow issuing from the nozzle 2 until the fluid actually reaches the higher one of the two monitored levels, viz. the level C—C in the presently described embodiment.

In the embodiment illustrated in FIG. 7 the inlet end 17a of the branch pipe 17 is situated in the same vessel B as the outlet portion 9 of the shroud 3. However, in other applications the outlet portion 9 of the shroud 3 and the inlet end 17a of the branch pipe 17 may be arranged in different vessels (not shown).

The incorporation of the flow rate limiter 18 provides for the desired intensification of the signal representative of the variation of the hydrodynamic condition of the liquid flow, because the reduction of the flow rate of the fluid reduces correspondingly the energy required to impart to it the necessary velocity at the mixing with the liquid flow issuing from the nozzle 2. Hence, the flow velocity increases, and the signal increases correspondingly.

In still another embodiment of the herein disclosed apparatus, illustrated in FIG. 8, all the components designated with numerals 1, 2, 3, 8, 9, 10, 17 and 18 are of the structure described hereinabove and illustrated in FIG. 7.

Figure 8:
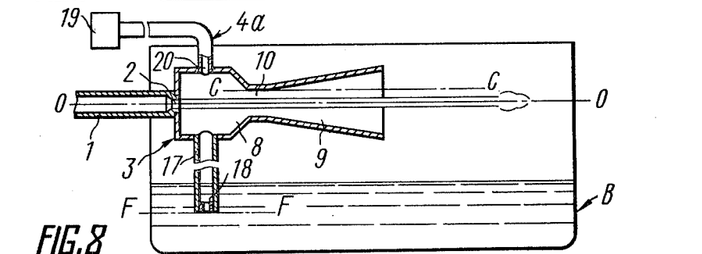
FIG. 8 is a schematic longitudinal sectional view of apparatus embodying the present invention, including a pressure pickup and a measuring duct communicating with the inlet portion of the shroud, the fluid being present at the other monitored level.

In the embodiment illustrated in FIG. 8 there is also included a device 4a for registering the variation of the hydrodynamic condition of the liquid flow issuing from the nozzle 2, caused by the mixing of this liquid flow with the fluid in the vessel B.

The registering device 4a includes a pressure receiver or pickup 19 adapted to respond to the variation of the pressure within the internal space of the inlet portion 8 of the shroud 3, as the hydrodynamic condition of the liquid flow varies.

The pickup 19 includes a pressure-responsive element and has any known per se structure suitable for the purpose.

The registering device 4a further includes a measuring duct 20 for communication between the pressure pickup 19 and the source of the pressure being measured, i.e. the internal space of the inlet portion 8 of the shroud 3.

In the embodiment of the apparatus, illustrated in FIG. 8, the internal space of the inlet portion 8 of the shroud 3 communicates with the inlet end of the measuring duct 20.

The communication between the inlet portion 8 of the shroud 3 and the inlet end of the measuring duct 20 provides for simple and reliable monitoring of the presence of the fluid at either one of the two monitored levels C—C and F—F, since in this embodiment the apparatus requires no additional supply sources and no signal conversion means.

Figure 9:
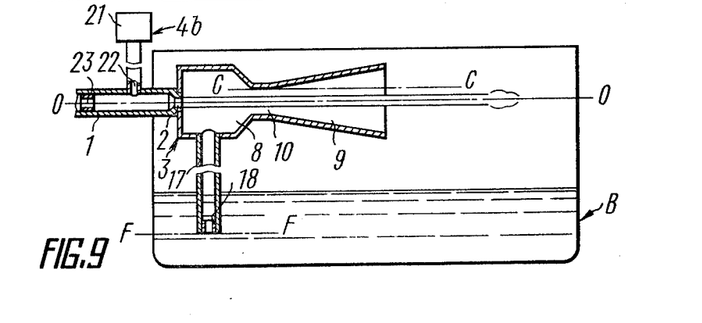
FIG. 9 is a schematic longitudinal sectional view of apparatus embodying the present invention, including a measuring duct and a flow rate limiter mounted in the supply pipe, the fluid being present at the other monitored level.

In still another embodiment of the apparatus according to the invention as illustrated in FIG. 9, all the components designated with numerals 1, 2, 3, 8, 9, 10, 17 and 18 are of the same structure described hereinabove and illustrated in FIGS. 7 and 8.

In the embodiment of the present invention, illustrated in FIG. 9, the apparatus includes a device 4b for registering the variation of the hydrodynamic condition of the liquid flow issuing from the nozzle 2.

The registering device 4b of this embodiment includes a pressure pickup 21 with pressure-responsive means, the pickup 21 being intended to register the variation of the pressure of the liquid in the supply pipe 1, caused by the variation of the hydrodynamic condition of the liquid flow issuing from the nozzle 2, on account of the mixing of this liquid with the fluid at the monitored level C—C in the vessel B.

The pressure pickup 21 may be of any known per se suitable structure.

The registering device 4b of the embodiment illustrated in FIG. 9 likewise has a measuring duct 22 adapted to convey the measured pressure to the pickup 21.

In this embodiment the inlet portion 8 of the shroud 3 communicates with the inlet end of the measuring duct 22 via the supply pipe 1 and the nozzle 2.

Since the variation of the hydrodynamic condition of the liquid flow is accompanied by a variation of the velocity of its flow through the nozzle 2, and, hence, a variation of its static pressure upstream of the nozzle 2 in the pipe 1, the communication between the inlet portion 8 of the shroud 3 and the inlet end of the measuring duct 22 via the supply pipe 1 and the nozzle 2 provides for registering the variation of the hydrodynamic condition of the liquid flow by the variation of the positive gauge pressure, simultaneously with the registering of the variation of the pressure in the inlet portion 8 of the shroud 3, or else independently of the last-mentioned variation.

In the embodiment of the apparatus, illustrated in FIG. 9, there is also incorporated a liquid flow rate limiter 23 mounted in the supply pipe 1 intermediate the liquid source and the inlet end of the measuring duct 22. The flow rate limiter or restrictor 23 of this embodiment is in the form of a short length of a tube of which the internal bore diameter is smaller than the internal diameter of the supply pipe 1.

The flow rate limiter 23, however, may be of any other known per se suitable structure.

The incorporation of the flow rate limiter 23 upstream of the inlet end of the measuring duct 22 increases the dependence of the pressure being measured on the hydrodynamic condition of the liquid flow through the nozzle 2, and also reduces the dependence of the measured pressure on variations of the liquid pressure in the liquid source.

In still another embodiment of the apparatus for monitoring the level of a fluid, illustrated in FIG. 10, all the components designated with numerals 1, 2, 3, 8, 9, 10, 11, 12, 13, 17 and 18 are of the structure described in connection with FIG. 7.

Figure 10:
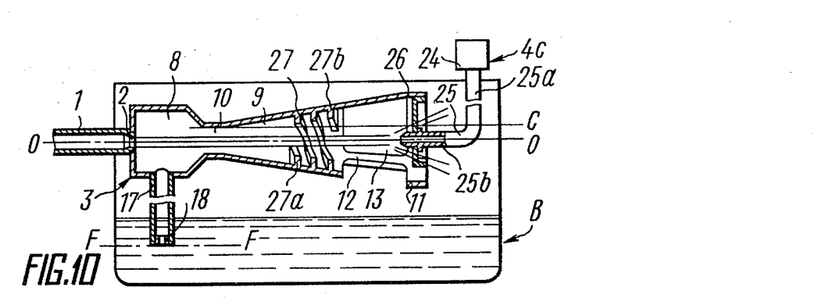
FIG. 10 is a schematic longitudinal sectional view of apparatus embodying the invention, including helical ribs internally of the outlet portion of the shroud, with the fluid present at the other monitored level.

The embodiment illustrated in FIG. 10 includes a device 4c for registering the variation of the hydrodynamic condition of the liquid flow through the nozzle 2. The device 4c includes a pressure receiver or pickup 24 adapted to register a variation of the total pressure of the liquid in the flow, as the latter's hydrodynamic condition varies. The pressure pickup 24 is of any suitable know per se structure. The registering device 4c further includes a measuring duct 25 adapted to supply the measured pressure to the pressure pickup 24 with which the duct 25 communicates by its outlet end 25a. The inlet end 25b of the measuring duct 25 is arranged to face the outlet portion 9 of the shroud 3, coaxially with the latter and with the nozzle 2, this inlet end 25b being supported by the ring 11 with aid of a bracket 26 of any suitable known per se structure.

In the embodiment of the apparatus, illustrated in FIG. 10, ribs 27 are provided internally of the outlet portion 9 of the shroud 3. The ribs 27 are made integrally with the outlet portion 9 of the shroud 3 and extend helically. These ribs 27 are intended to impart a tangential component of the velocity to the flow resulting from the mixing of the liquid issuing from the nozzle 2 with the fluid in the vessel B. The end portions 27a and 27b of the helical ribs 27 have a gradually decreasing height, merging smoothly with the internal wall of the outlet portion 9 of the shroud 3.

The provision of the helical ribs 27 ensures redistribution of the energy of the mixed flow so that the total pressure within the measuring duct 25 falls, whereby there is increased the pressure drop registered by the pickup 24, which enhances the response and reliability of the performance of the apparatus.

In yet another embodiment of the apparatus, illustrated in FIG. 11, the supply pipe 1 with the nozzle 2, the inlet portion 8, the neck portion 10, the branch pipe 17 with the flow rate limiter 18, the pressure pickup 24 and the measuring duct 25 with its inlet and outlet ends, i.e. all the components designated with numerals 1, 2, 8, 10, 17, 18, 24 and 25 have the same structure as those described hereinabove and illustrated in FIG. 10.

Figure 11:
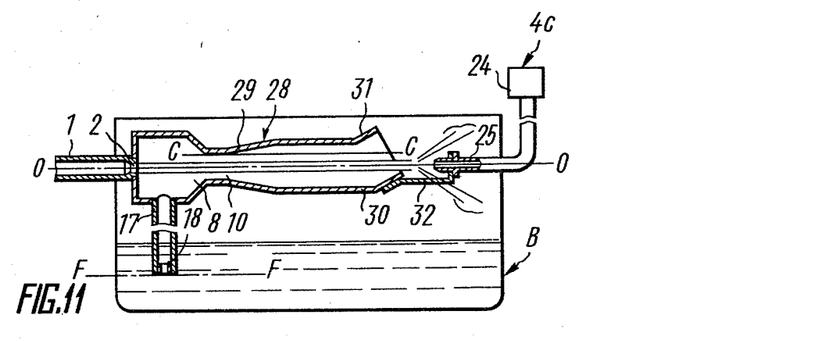
FIG. 11 is a schematic longitudinal sectional view of apparatus embodying the present invention, with the outlet portion of the shroud extending at an angle to the longitudinal axis of the nozzle and with the inlet portion of the measuring duct facing the outlet portion of the shroud and extending coaxially with the nozzle, in the presence of the fluid at the other monitored level.

The embodiment of the apparatus, illustrated in FIG. 11, comprises a shroud 28 adapted to communicate with the monitored level C—C of the fluid in the vessel B. The shroud 28 has the inlet portion 8 and neck portion 10 of the structure identical with that described hereinabove and illustrated in FIGS. 1, 2, 5, 6, 7, 8, 9 and 10.

The shroud 28 has a tapering portion 29 and a cylindrical portion 30 which are coaxial and have their common axis coinciding with the axis O—O of the apparatus. The portions 29 and 30 of the shroud 28 are adapted to shape a mixed flow resulting from the mixing of the liquid flow issuing from the nozzle 2 with the fluid in the vessel B.

The shroud 28 further has an outlet portion 31 extending at an angle to the longitudinal axis O—O. Ths outlet portion 31 of the shroud 28 is adapted to deflect the mixed flow as it enters the vessel B.

The apparatus further includes a bracket 32 for supporting the inlet end of the measuring duct 25 in opposition to the outlet portion 31 of the shroud 28.

The arrangement of the outlet portion 31 of the shroud 28 at an angle to the longitudinal axis O—O and to the inlet end of the measuring duct 25, coaxial with the shroud 28, provides for deflection of the mixed flow away from the inlet end of the measuring duct 25. Therefore, as the liquid jet issuing from the nozzle 2 mixes with the fluid coming into the internal space of the shroud 28 from any one of the monitored levels F—F and C—C, even greater reduction of the total pressure within the measuring passage 25 takes place.

Consequently, there is increased the pressure drop registered by the pickup 24, which enhances the response and performance reliability of the apparatus.

In yet another embodiment of the present invention in an apparatus for monitoring the level of a fluid in a vessel B, illustrated in FIG. 12, the supply pipe 1 with the nozzle 2, the shroud 3 and the branch pipe 17 with the limiter 18, i.e. all the components designated with numerals 1, 2, 3, 8, 9, 10, 17 and 18 have the same structure as has been described hereinabove and illustrated in FIGS. 8 and 9.

Figure 12:
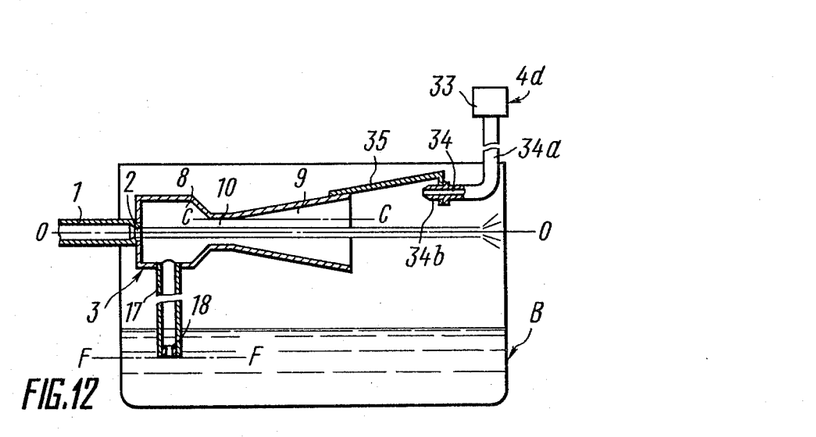
FIG. 12 is a schematic longitudinal sectional view of apparatus embodying the present invention, wherein the inlet end of the measuring duct is offset relative to the axis of the nozzle arranged coaxially with the outlet portion of the shroud, in the presence of the fluid at the other monitored level.

In the embodiment of the apparatus, illustrated in FIG. 12, the registering device 4d includes a pressure receiver or pickup 33 with a responsive element, adapted to register the total pressure of the flow, following the mixing of the liquid flow through the nozzle 2 with the fluid in the vessel B at the monitored level C—C.

The pressure pickup 33 is of any suitable known per se structure. The registering device 4d includes a measuring duct 34 adapted to convey the pressure being measured to the pickup 33. The outlet end 34a of the measuring duct 34 communicates with the pressure pickup 33, while its inlet end 34b is positioned to face the outlet portion 9 of the shroud 3 and is spaced or offset from the axis O—O of the nozzle 2. In the embodiment of the invention shown in FIG. 12 the outlet portion 9 of the shroud 3 is arranged coaxially to the nozzle 2.

Alternatively, the measuring duct 34 may have a plurality of inlet ends (not shown) spaced from the axis O—O. The plurality of the symmetrically arranged inlet ends may also be united, so that the inlet end of the measuring duct 34 is shaped as an annulus (not shown).

The inlet end 34b of the measuring duct 34 of the embodiment being described is supported by the shroud 3 with aid of a bracket 35.

The coaxial arrangement of the nozzle 2 and of the outlet portion 9 of the shroud 3 in an embodiment wherein the inlet end of the measuring duct is offset from the axis O—O provides for monitoring the appearance of the fluid by the presence of the liquid flow at the periphery of the outlet portion 9 of the shroud 3, registered as a positive gauge pressure signal.

The operation of the apparatus in accordance with the present invention, illustrated in FIGS. 1 and 2 of the appended drawings, is as follows.

In the embodiments described the fluid in the vessel B, of which the level is to be monitored, is a liquid.

To make the apparatus operative, it is necessary to supply from the source into the supply pipe 1 a liquid under a pressure in excess of the pressure of the ambient medium in the vessel B.

When there is no fluid at the level C—C being monitored, the liquid jet issuing from the nozzle 2 internally of the shroud 3 does not engage the latter and practically does not vary its shape and cross-sectional diameter. Therefore, the jet passes through the opening 6 in the diaphragm 5 without engaging the latter. Therefore, the diaphragm 5 is not influenced by the liquid flow and is not deformed, whereby the electric resistance of the strain gauge 7 does not vary.

When the fluid appears at the monitored level C—C, there takes place engagement and mixing of the fluid and the liquid issuing from the nozzle 2.

This mixing results in the variation of the hydrodynamic condition or state of the liquid flow, so that the jet diverges into engagement with the walls of the outlet portion 9, occupying the entire cross-section of the latter. Therefore, the liquid flow engages the diaphragm 5, which engagement deforms this diaphragm 5.

The deformation of the diaphragm 5 results in a variation of the electric resistance of the strain gauge 7, which is measured by the receiver of the signal sent by this strain gauge 7, the variation of the measured resistance being used to register the variation of the hydrodynamic condition of the liquid flow. Upon engagement with the diaphragm 5, the liquid flow exits through the opening 6 and the ports 13.

As a result of the divergence of the jet, as the liquid flow issuing from the nozzle 2 and the fluid mix, into engagement with the shroud 3 along the entire contour of the neck portion 10, the internal space of the inlet portion 8 becomes isolated, and there sets therein a reduced pressure equalling the static pressure of the liquid flow. The greater the velocity of the emergence of the liquid from the nozzle 2, the lower is the pressure within the inlet portion 8 of the shroud 3.

Upon the fluid level in the vessel 8 subsequently lowering below the monitored level C—C, the hydrodynamic condition of the liquid flow does not change, since the reduced pressure is maintained within the inlet portion 8 of the shroud 3. Therefore, the character of the interaction of the liquid flow with the diaphragm 5 would not vary, and, consequently, the varied resistance of the strain gauge 7 is retained, this varied resistance being representative of the fluid having attained the monitored level C—C.

The steady variation of the hydrodynamic condition of the flow takes place with the ratio of the maximum size of the contour of the neck portion 10 to its spacing from the outlet section of the nozzle 2 being less than 0.35:1. To restore the apparatus to the initial state, it is sufficient to interrupt the supply of the liquid into the supply pipe from the pressurized liquid source.

In the embodiment of the apparatus, illustrated in FIG. 5, the placement into operation is done similarly to the embodiment illustrated in FIGS. 1 and 2, i.e. by initiating the supply of the liquid under pressure into the supply pipe 1.

With no fluid at the monitored level C—C, the liquid jet issuing from the nozzle 2 does not change its shape within the shroud 3 and passes through the opening 6 without engaging the diaphragm 5, as it is the case with the apparatus illustrated in FIGS. 1 and 2.

When the liquid appears at either one of the monitored levels C—C or D—D, there takes place a variation of the hydrodynamic condition of the liquid flow.

Depending on the inclination of the shroud 3, and also on whether the monitored levels of the fluid are within the same one or different vessels, the sequence of the appearance of the fluid at the monitored levels may be correspondingly different.

If the fluid first appears at the monitored level C—C, the variation of the hydrodynamic condition of the liquid flow is identical with the corresponding variation in the operation of the apparatus illustrated in FIGS. 1 and 2.

If the fluid appears first at the monitored level D—D, it flows via the passage 15 of the pipe 14 and the opening 16 into the internal space of the inlet portion 8 of the shroud 3.

This results in the engagement and mixing of the flow of the liquid, issuing from the nozzle 2, with the fluid, and in the variation of the hydrodynamic condition of the liquid flow, similar to the variation described hereinabove in connection with the operation of the apparatus illustrated in FIGS. 1 and 2.

In this case the apparatus resumes its initial state where the liquid jet issuing from the nozzle 2 does not engage the walls of the shroud 3 when the level of the fluid falls below both monitored levels C—C and D—D.

The registering of the variation of the hydrodynamic condition of the liquid flow is effected in a manner similar to that described hereinabove in connection with the operation of the apparatus illustrated in FIGS. 1 and 2.

In case of the embodiment of the apparatus, illustrated in FIG. 6, the commencement of the operation, the variation of the hydrodynamic condition of the liquid flow and the registering of this variation are effected as it has been already described in connection with the operation of the apparatus illustrated in FIGS. 1, 2, 3, 4 and 5.

When there is no fluid at the monitored level C—C upstream of the outlet portion 9 of the shroud 3, the liquid jet issuing from the nozzle 2 does not engage the walls of the shroud 3 and exits through the opening 6 in the diaphragm 5.

When the liquid appears at the monitored level C—C, there take place mixing of the liquid with the fluid and the variation of the hydrodynamic condition of the flow, accompanied by the divergence of the liquid jet.

Meanwhile, the internal space of the inlet portion 8 of the shroud 3 communicates with the other monitored level E—E where there is no fluid. Therefore, the pressure in this space lowers insignificantly, whereby the signal derived from the registering device 4 does not attain the maximum value.

When the fluid level rises to the level E—E at the entrance of the inlet end of the branch pipe 17, there takes place stepwise increase of the differential between the pressure at the monitored level and the pressure within the internal space of the inlet portion 8 of the shroud 3, with the output signal of the registering device 4 increasing correspondingly in its value.

When the fluid level falls below the monitored level E—E at the entrance of the inlet end of the branch pipe 17, the output signal of the registering device 4 decreases once again. Upon the fluid level having subsequently fallen below the shroud 3, there take place a variation of the hydrodynamic condition of the liquid flow and a corresponding variation of the output signal of the registering device 4.

In the case of the embodiment of the apparatus, illustrated in FIG. 7, the commencement of the operation, the variation of the hydrodynamic condition of the liquid flow and the registering of this variation are as it has been already described in connection with the operation of the apparatus illustrated in FIG. 6.

In the embodiment illustrated in FIG. 7 a variation of the hydrodynamic condition of the liquid flow, accompanied by the divergence of the flow also takes place upon the fluid level rising to the monitored level C—C. In this case the restriction of the flow rate of the fluid drawn in from the other monitored level F—F via the branch pipe 17 ensures that the available energy of the liquid flow issuing from the nozzle 2 is to a higher degree spent on increasing the energy of the mixed flow of the liquid. Therefore, the level of the output signal of the registering device rises. With the fluid level descending below the monitored level C—C, the hydrodynamic condition of the flow of the liquid through the nozzle 2 and the level of the output signal of the registering device 4 do not vary until the fluid is present at the other monitored level F—F.

In the case of the embodiment illustrated in FIG. 8 the commencement of the operation of the apparatus, the variation of the hydrodynamic condition of the liquid flow and of the level of the output signal of the device registering this variation are as it has been already described in connection with the operation of the apparatus illustrated in FIG. 7. The variation of the hydrodynamic condition of the liquid flow is registered by the variation of pressure in the internal space of the inlet portion 8 of the shroud 3.

When the fluid is present at both monitored levels C—C and F—F, and also when the fluid is present only at the level F—F of the input end of the branch pipe 17, following the descent of the fluid level from the monitored level C—C, the pressure pickup 19 registers the suction in the internal space of the inlet portion 8. On the other hand, if the fluid level has failed to achieve the monitored level C—C, and also if the fluid is absent at both monitored levels C—C and F—F, the pickup 19 registers the equality of the pressure values within the internal space of the inlet portion 8 of the shroud 3 and upstream of the outlet portion 9.

In the case of the embodiment of the apparatus, illustrated in FIG. 9, the commencement of the operation of the apparatus, the variation of the hydrodynamic condition of the liquid flow upon the changes in the level of the fluid and the corresponding variations of the pressure within the internal space of the inlet portion 8 of the shroud 3 are as it has been already described in connection with the operation of the apparatus illustrated in FIGS. 7 and 8.

A variation of the hydrodynamic condition of the liquid flow through the nozzle 2 results in a variation of the pressure of the liquid in the supply pipe 1 upstream of the nozzle 2.

In case the emergence of the liquid from the nozzle 2 has not been accompanied by its mixing with the fluid, and the liquid jet does not engage the walls of the shroud 3, the pressure in the supply pipe 1 upstream of the nozzle 2 practically equals the pressure under which the liquid is supplied from the source.

Following the variation of the hydrodynamic condition of the liquid flow, caused by the appearance of the fluid at the monitored level C—C upstream of the outlet portion 9 of the shroud 3, accompanied by the divergence of the liquid jet, the pressure in the supply pipe 1 upstream of the nozzle 2 lowers. This variation of the pressure within the supply pipe 1 is registered by the pressure pickup 21, the flow rate limiter 23 acting as the amplifier of the signal, preventing as it does the partial restoration of the pressure registered by the pickup 21.

In the case of the embodiment illustrated in FIG. 10 the commencement of the operation of the apparatus, the variation of the hydrodynamic condition of the liquid flow and of the output signal level, following the changes in the fluid level, are as it has been already described hereinabove in connection with the operation of the apparatus illustrated in FIG. 7. At the absence of the fluid at both monitored levels C—C and F—F, as well as prior to the appearance of the fluid at the monitored level C—C downstream of the outlet portion 9 of the shroud 3, the liquid jet issuing from the nozzle 2 practically does not change its direction and shape throughout the distance between the outlet section of the nozzle 2 and the inlet end of the measuring duct 25. Therefore, the pressure pickup 24 in this case responds to the absence of fluid with the maximum output signal.

With the fluid appearing at the monitored level C—C downstream of the outlet portion 9 of the shroud 3, there take place the mixing of the liquid flow issuing from the nozzle 2 with the fluid and the divergence of the liquid jet, whereby the static pressure and the flow velocity decrease below their respective values prior to the mixing. Therefore, the output signal of the pressure pickup 24 decreases in value, thus registering the variation of the hydrodynamic condition of the liquid flow.

As the mixed flow diverges to the walls of the outlet portion 9 of the shroud 3, the flow engages and cooperates with the helically extending ribs 27. As a result of its engagement with the helical ribs 27, the flow is imparted a tangential component of its velocity, whereby the energy of the liquid flow is redistributed, with the axial component of the velocity of the flow adjacent to its axis diminishing in value.

A consequence of this reduction of the axial component of the flow velocity in the presence of the fluid at the level F—F being monitored is the further reduction of the pressure registered by the pickup 24, and the corresponding improvement of the response of the apparatus.

In the case of the embodiment of the apparatus, illustrated in FIG. 11, the commencement of its operation, the variation of the hydrodynamic condition of the liquid flow, the registering of this variation and the variation of the level of the output signal of the pressure pickup 24 are as it has been already described hereinabove in connection with the operation of the apparatus illustrated in FIG. 10.

Prior to the mixing of the liquid flow through the nozzle 2 with the fluid at the monitored level C—C, the pressure pickup 24 sends the maximum signal, being as it is acted upon by the total pressure of the liquid jet issuing from the nozzle 2.

Upon the liquid issuing from the nozzle 2 having mixed with the fluid, the inlet end of the measuring duct 25 becomes situated outside the flow of the liquid deflected at an angle relative to the inlet portion of the measuring duct 25.

Consequently, the pressure registered by the pickup 24 is reduced, which means that the response of the apparatus is enhanced accordingly.

In the case of the embodiment of the apparatus, illustrated rated in FIG. 12, the commencement of its operation and the variation of the hydrodynamic condition of the liquid flow take place as it has been described hereinabove in connection with the operation of the apparatus illustrated in FIG. 7.

Prior to the mixing of the liquid flow issuing from the nozzle 2 with the fluid at the level C—C, the pickup 33 receives the pressure equalling the pressure in the vessel B, the inlet end of the measuring duct 34 being not engaged by the liquid flow. Following the appearance of the fluid at the monitored level C—C, there takes place the mixing of the liquid flow issuing from the nozzle 2 with the fluid downstream of the outlet portion 9 of the shroud 3, and the liquid jet diverges. The liquid flow now occupies the entire section of the outlet portion 9 of the shroud 3. The inlet end of the measuring duct 34 is now within the liquid flow, and the pressure pickup 33 registers the variation of the hydrodynamic condition of the liquid flow.

A pilot model of the presently disclosed apparatus for monitoring the level of a fluid has been subjected to a comprehensive testing program which has proved the sufficiently high reliability of its performance, matched by the relatively simple structure of the apparatus.

The herein disclosed apparatus provides for reliable monitoring of a fluid level within a broad range of liquid pressure values and is of a general-purpose character, which enables to use in most various industries and arts.

It should be understood that those competent in the art can introduce various modifications and changes into the disclosed structure of the apparatus, without departing from the spirit and scope of the present invention.

What we claim is:

1. Apparatus monitoring the level of a fluid in a vessel, comprising a source of liquid under pressure in excess of the pressure of the ambient medium; a vessel containing a fluid; a supply pipe having an inlet end and an outlet end, said supply pipe being adapted to have its inlet end communicating with said liquid source; a nozzle adapted to issue through the outlet section thereof a flow of a liquid from said liquid source, communicating with the outlet end of said supply pipe; a shroud having an inlet portion and an outlet portion, said shroud having its inlet portion communicating with said nozzle and being adapted to communicate with said vessel containing the fluid at a monitored level; said shroud having at least one cross-section of which the ratio of the maximum size of the internal contour to the spacing of this section from the outlet section of said nozzle is less than 0.35:1; the inlet portion of said shroud having a structure wherein the internal contour of the cross-section thereof encompasses therein the contour of the outlet section of said nozzle; a device for registering variation of the hydrodynamic condition of the liquid flow issuing from said nozzle, caused by the mixing of this liquid flow with the fluid in said vessel.

2. The apparatus of claim 1, wherein the inlet portion of said shroud is provided with a pipe adapted to have its inlet end communicating with said vessel with the fluid at another monitored level.

3. The apparatus of claim 2, wherein the inlet end of said pipe is spaced from the longitudinal axis of said shroud.

4. The apparatus of claim 2, wherein said pipe incorporates means for restricting the flow rate of the fluid.

5. The apparatus of claim 1, wherein said registering device includes a pressure pickup with a pressure-responsive element, and a measuring duct having its outlet end communicating with said pressure pickup, the inlet portion of said shroud communicating with the inlet end of the measuring duct of said registering device.

6. The apparatus of claim 5, wherein the inlet portion of said shroud communicates with the inlet end of the measuring duct of said registering device through said supply pipe and said nozzle.

7. The apparatus of claim 6, including a liquid flow restricting means mounted in said supply pipe intermediate said liquid source and the inlet end of the measuring duct of said registering device.

8. The apparatus of claim 1, wherein said registering device includes a pressure pickup and a measuring duct of which the outlet end communicates with this pressure pickup, the inlet end of the measuring duct facing the outlet portion of said shroud and being arranged coaxially with said nozzle, the interior of the outlet portion of said shroud being provided with helically extending ribs adapted to impart a tangential component of the velocity to the liquid flow issuing from said nozzle.

9. The apparatus of claim 1, wherein said registering device includes a pressure pickup with a responsive element and a measuring duct having its outlet end communicating with this pressure pickup, the inlet end of this measuring duct facing the outlet portion of said shroud and being arranged coaxially with said nozzle, the outlet portion of said shroud extending at an angle to the longitudinal axis of said nozzle.

10. The apparatus of claim 1, wherein said registering device includes a pressure pickup with a responsive element and a measuring duct of which the outlet end communicates with this pressure pickup, the inlet end of this measuring duct facing the outlet portion of said shroud and being spaced from the axis of said nozzle, the outlet portion of said shroud being coaxial with said nozzle.

* * * * *